T. MALCOLMSON.

Assignor of one-half to O. B. GOODWIN.

STEAM GOVERNOR.

No. 10,559. Reissued Feb. 10, 1885.

Witnesses

W. R. Edelin

Robt. H. Porter

Inventor

Thomas Malcolmson

Per Hallock & Hallock

Atts

UNITED STATES PATENT OFFICE.

THOMAS MALCOLMSON, OF OIL CITY, PENNSYLVANIA, ASSIGNOR OF ONE-HALF TO OCTAVIUS B. GOODWIN, OF SAME PLACE.

STEAM-GOVERNOR

SPECIFICATION forming part of Reissued Letters Patent No. 10,559, dated February 10, 1885.

Original No. 289,427, dated December 4, 1883. Application for reissue filed September 17, 1884.

*To all whom it may concern:*

Be it known that I, THOMAS MALCOLMSON, a citizen of the United States, residing at Oil City, in the county of Venango, in the State of Pennsylvania, have invented certain new and useful Improvements in Steam-Engine Governors, of which the following is a full, clear, and exact description.

My invention relates to that class of steam-engine governors which regulate the supply of steam to the cylinder by means of a throttle-valve placed in the steam-supply pipe, which class is generally known as "throttling-governors."

My invention consists in providing new and improved means for regulating the throttle-valve from the centrifugal action of the fly-weights, which means are broadly as follows: I connect the throttle-valve stem with the receptive part of a friction-clutch, and with a counter-balance to resist the action of the generative or impinging part of said friction-clutch, and I so apply the fly-weights to the said impinging part of said friction-clutch that they regulate the degree of friction generated by their centrifugal action. Consequently, the action of the said counter-weight or counter-balance is more or less overcome as the fly-weights are more or less rapidly rotated. The object of this construction is to secure so very sensitive a device that it will instantly respond to changes in the load or steam conditions, as will hereinafter fully appear in this description.

Figure 1:
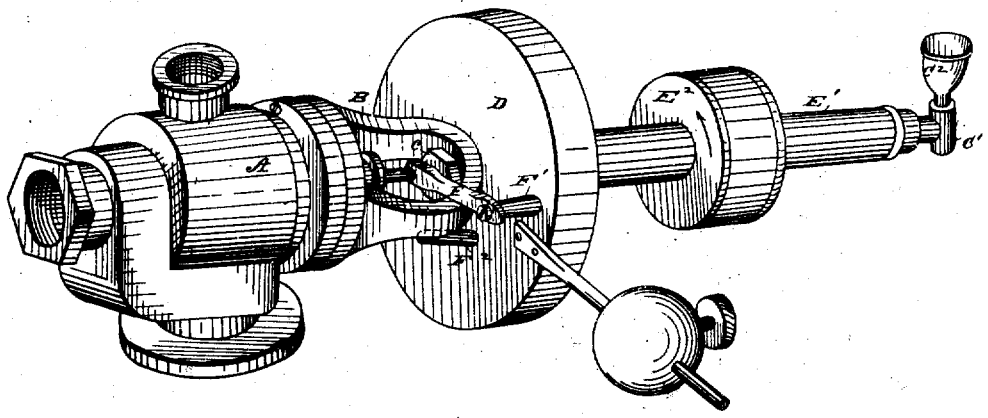
Figure 2:
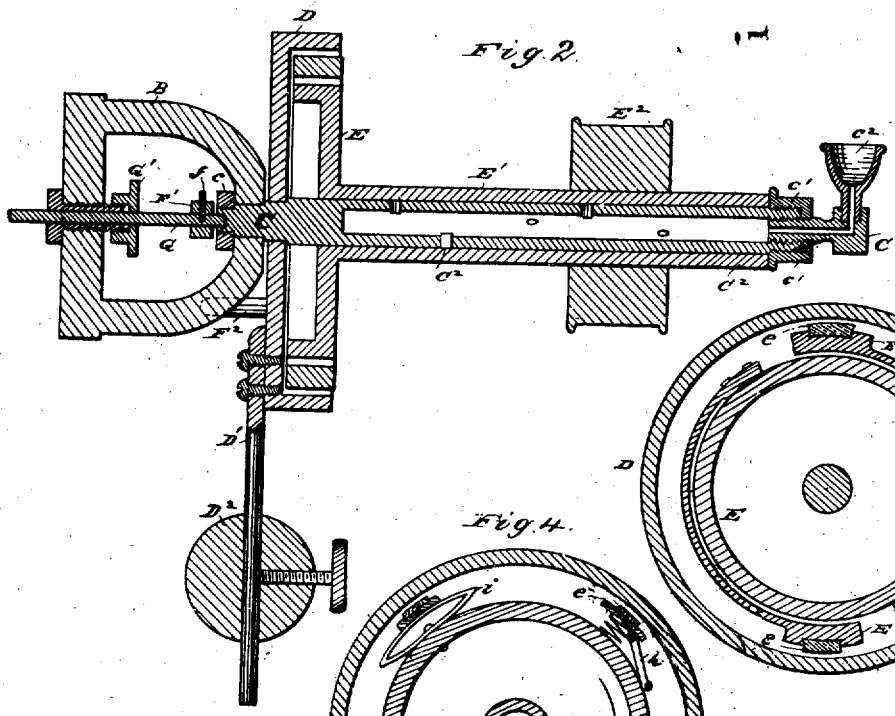
Figure 3:
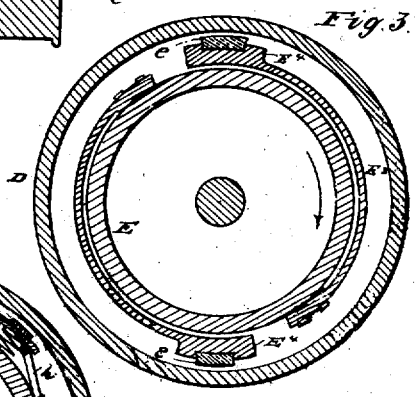
Figure 4:
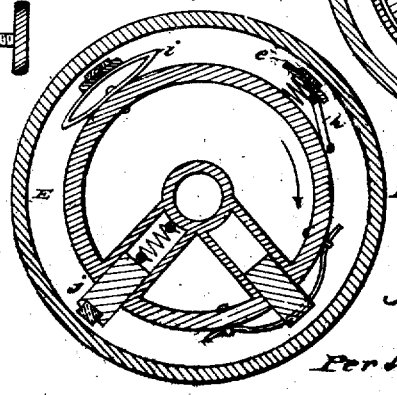

In the accompanying drawings, Figure 1 is a perspective showing my governor upon a horizontal shaft secured to the throttle-valve casing. Fig. 2 is a longitudinal vertical section of the same, but detached from the valve-casing. Fig. 3 is a transverse section of the revolving disk, its spring-weights, and surrounding disk; and Fig. 4 represents modifications of a governor's spring-weights constructed in accordance with my invention.

Like letters refer to like parts in all the figures.

A represents the throttle-valve chamber, which is supposed to be connected with the steam-chest, and the valve therein will regulate the supply of steam in the usual well-known manner.

B represents a bracket secured in any suitable manner to the end of the valve-chamber from which the valve-stem protrudes, a stuffing-box, G′, being provided for packing the valve-stem. A shaft, C, is seated in the apex or arch of the bracket and secured thereto by a nut, *c*. The valve-stem G has its outer end seated or journaled in the end of the shaft. The shaft C, which is thus rigidly supported by the bracket, serves as a journal for the flanged disk D, which I shall designate as the "receptive part of a clutch," and also for a second disk, E, which I shall designate as the "active part of a clutch," rigidly secured or formed integral with a sleeve, E′, also journaled on said shaft, and to which the belt-pulley $E^2$ is also rigidly secured. These parts, which are loosely journaled on the shaft C, are held against longitudinal movement by a nut, *c′*, at the end of the shaft. The shaft C is hollow throughout a portion of its length sufficient in extent to serve as an oil-chamber for the sleeve E′, perforations $c^2$ being made in the walls of the chamber and filled with wooden plugs or fiber the grain of which is disposed lengthwise in the perforations, in order to conduct by capillary attraction the oil from the chamber through the perforations and against the inner or bearing surface of the sleeve. An elbow, C′, is fitted to the outer end of the oil-chamber and is provided with an oil-cup, $C^2$. The disk D is provided in this instance with a projecting arm, D′, to which is adjustably secured the counter-balance $D^2$. By this means the resistance of the counter-balance against the friction applied to rotate the disk may be varied to suit requirements. Further on I will describe an alternative method of connecting the counter-balance to the disk D. The disk D is the receptive part of the friction-clutch above named. It is connected with the valve-stem G by an arm, F′, attached rigidly to the stem and to a stud, F, on the disk, and therefore as the disk D is moved on its journal the valve-stem is similarly moved. A second post, $F^2$, serves as a stop to limit the movement of the disk.

Motion is communicated from the rotating sleeve E′ to the disk D as follows: To the disk E are secured, in this instance by flat arc-springs $E^3$, which are suitably bent and conformed to its periphery, weights $E^1$, which are in this instance retained inwardly by the said springs, and lie when the parts are at rest upon the periphery of the disk E, and below but not in contact with the flange of the disk D. Friction-pads *e* are secured to said weights in dovetail recesses on the outer or upper surface of said weights and in such position as to impinge upon the inner surface of the flange of disk D when the weights are thrown out centrifugally by the rotation of disk E. These parts—viz., the weights, springs, and disk E—I call the "actuating or impinging part" of said friction-clutch. The small weights $E^1$ are the fly-weights of the governor, and the springs $E^3$ are the arms of said weights, and the action of said weights as they are thrown out centrifugally is a frictional action upon the flange of the disk D, the degree of friction depending on the degree of momentum given to the disk E. The action of the counter-balance is to keep the valve open, and the action of the friction-clutch is to overcome the counter-balance and close the valve. The counter-balance, by its adjustment on the arm D′, determines the normal speed of the engine. If it is adjusted near to the disk, its weight is more easily overcome by the friction-clutch, and hence the valve will be moved to a close with the engine running at less speed than if the weight is farther off from the disk. The operation is as follows: The position of parts shown is that which they occupy when the engine is at rest, the valve is wide open, and the two parts of the friction-clutch are disengaged. When the engine starts, motion is given to the pulley $E^2$ by the governor-belt and the sleeve E′ and disk E are rotated. As soon as the speed becomes sufficient to cause the weights $E^1$ to overcome the retractive force of their spring-arms sufficiently for them to impinge upon the receptive part of the friction-clutch and produce friction thereon, the counter-weight will be lifted and held in suspension, thus moving the valve toward a close, the parts assuming such a position as will keep the engine at its normal speed until changes in the steam or load condition occur. Let it be supposed that an increase of steam-pressure occurs. It will tend to increase the speed of the engine; but this will carry the weight higher and move the valve farther to a close. Then let it be supposed that an increase of load occurs. This may be sudden, and if it is, it will cause a sudden shock to the momentum of the engine which will be instantly felt by the fly-weights, which will momentarily release their pressure on the receptive part of the friction-clutch, and this will free that part—viz., the disk D—and the weight $D^2$ will drop and open the valve wide again, the increased volume of steam will at once overcome the added load, and the engine will assume its normal speed, which will of course cause the friction-clutch to again lift the weight and more or less close the valve. If the added load, in place of being added suddenly, should be added gradually, the engine would soon begin to slow down gradually, and the friction in the clutch would not be sufficient to retain the weight up as far as before, and it would gradually fall and so open the valve slowly until a proper opening would be had to supply sufficient steam to carry the load at its normal speed.

In all fly-ball or centrifugal governors a considerable change of speed is required to overcome the inertia of the balls so they will move into another plane or orbit, and hence they are not delicately sensitive to changes of condition; but in my governor the weight $D^2$ is not thus affected by the velocity of the rotating parts of the governor. The real fly-weights $E^1$ $E^1$, by reason of their spring-arms, are very sensitive, and, besides, they do not move in the orbit their centrifugal force would bring them to but are kept back from it by the receptive part of the friction-clutch, and hence they do not acquire that inertness they would if moving in such orbit, but, on the contrary, become more sensitive to changes of condition. A very slight diminution of the degree of friction which keeps the weight $D^2$ suspended will allow it to drop. Therefore my governor is exceedingly delicate in its action and sensitive to very slight changes in the conditions of steam or load, and very perfect results are attained. It is apparent that many modifications or variations in the mechanism of a governor constructed in accordance with my invention are within the scope of mechanical skill—as, for instance, instead of the flat arc-springs conformed to the periphery of the disk E, arms *h*, as seen in Fig. 4, may be hinged to the periphery of the disk E, and provided with frictional weights $e^2$, retained from the disk D by retractible coiled springs. Elliptical springs *i*, secured to the periphery of the disk E, may be interposed between the flanges of the disks D and E and weights secured to the outer leaf thereof. Coiled springs may be secured to the inner disk and provided with radiating-weights *j*, and adapted to slide in grooves therein, and project against the flange of the outer disk. Furthermore, the disks may be in skeleton form—that is, comprising hubs, spokes, and flange. If desired, one or more of said spokes may be hollow and a weight inclosed therein in the form of a piston, secured to the hub or spoke by a retractible spring. Other means may be employed for lubricating the journals of the moving parts.

Instead of the exterior counter-balance, $D^2$, being supported by a rigid arm to the disk D, a strap or chain winding upon the periphery of the disk, and having a counter-balance attached thereto, may be employed; or a retractible spring may be secured to the arch B at one end and to the arm F′ or post F or $F^2$ at the other end, to take the place and perform the functions of the counter-balance. A helical spring placed between the disks D and E, and having its ends secured, respectively, to each one of these disks, may also perform the same function.

Further alternative constructions are disclosed in a companion application filed by me and pending at the same time.

Having described my invention and its operation, what I claim as new is—

1. In a speed-governor for steam-engines, substantially as set forth, the combination of a valve-stem, a counter-balance connected with said stem and operating to hold the valve in one position, a friction-clutch one part of which is rotated by the movement of the engine for moving said valve-stem in opposition to said counter-balance, and, finally, means, substantially as shown, whereby the degree of friction exerted by said friction-clutch is regulated by the speed of the engine.

2. In a speed-governor for steam-engines, the combination, substantially as shown, of the following elements: a stem or part by which the valve is moved, a counter-balance connected with said stem and operating to hold the valve in one position, the receptive part or disk D of a friction-clutch, connected with said stem, for moving the valve in opposition to the said counter-balance, a part which is rotated by the movement of the engine, the active part or disk E of said friction-clutch, mounted on said rotated part, and, finally, means, substantially as shown, for regulating the degree of friction exerted by said active part of said clutch from the degree of speed of said rotated part.

3. In a speed-governor for steam-engines, the combination of a shaft, a flanged disk loosely journaled thereon, connected to the valve-stem and inclosing a second disk, and interposed weights connected by springs to said inclosed disk, with a counter-balance or its described equivalent secured to the inclosing-disk, and means for revolving the inclosed disk, substantially as described.

4. In a speed-governor for steam-engines, the combination of a shaft adapted to receive the end of the valve-stem, a bracket for its support, a flanged disk, D, journaled upon the shaft, and provided with an arm connected to the valve-stem, and a stop-post, $F^2$, with a sleeve provided with a flange-disk, E, means for revolving the disk E, and weights connected to the flange of said disk and adapted to be thrown therefrom by centrifugal impulse, substantially as specified.

5. In a speed-governor for steam-engines, the combination, with the valve-stem, of two flanged disks, one arranged within the other, interposed weights adapted to be forced by centrifugal impulse from one disk to the other, and a counter-balance or its described equivalent, substantially as specified.

6. The combination of the hollow shaft C, perforated as described, wooden plugs $c^2$, the elbow $C'$, oil-cup $C^2$, sleeve $E'$, and disk E, of a governor carrying weights secured to springs, substantially as specified.

7. The combination of the bracket B, shaft C, disks D and E, weights secured to springs between said disks, and adjustable counter-balance $D^2$, with the valve-stem G and suitable connections, substantially as specified.

In testimony whereof I hereunto set my hand in the presence of two witnesses.

THOMAS MALCOLMSON.

Witnesses:

JNO. K. HALLOCK,
O. B. GOODWIN.